United States Patent [19]

Roberts

[11] Patent Number: 5,003,925
[45] Date of Patent: Apr. 2, 1991

[54] FISH FOOD DISPENSER

[76] Inventor: John D. Roberts, P.O. Box 568, Lemont, Pa. 16851

[21] Appl. No.: 447,591

[22] Filed: Dec. 8, 1989

[51] Int. Cl.⁵ ................................................ A01K 1/10
[52] U.S. Cl. .................... 119/51.04; 222/170; 119/51.15; 119/51.01
[58] Field of Search ............... 119/51.04, 51.01, 51.11, 119/51.14, 51.15, 56.1; 222/650, 454, DIG. 1, 162, 170; 43/132.1, 133, 134

[56] References Cited

U.S. PATENT DOCUMENTS

| | | | |
|---|---|---|---|
| 2,042,455 | 6/1936 | Barrott | 222/454 |
| 2,700,489 | 1/1955 | Sheft | 119/51.04 |
| 3,031,109 | 4/1962 | Krag | 119/51.04 X |
| 3,043,479 | 7/1962 | Gaukstern | 222/650 X |
| 3,140,693 | 7/1964 | Kaunzner | 119/51.04 |
| 3,156,214 | 11/1964 | Denny et al. | 119/51.04 |

FOREIGN PATENT DOCUMENTS 1379955 10/1964 France ................. 222/650

Primary Examiner—Gene Mancene
Assistant Examiner—R. Thomas Price

[57] ABSTRACT

For the dispensing of preset quantities of flowable material, a dispenser comprised of a hollow casing with integral scoop and chute; whereby rotation of the casing causes material stored within to be passed from the scoop to the chute, either by tossing or by sliding on a ramp, where material is guided to a dispense port.

3 Claims, 2 Drawing Sheets

FISH FOOD DISPENSER

BACKGROUND OF THE INVENTION

My invention relates to dispensers of flowable material in general and more specifically to those meant for mounting on a fish tank for dispensing of dry fish food onto the surface of the water. Usually dispensers of this type are used with timing means to provide periodic automatic fish feeding.

For an automatic fish feeder to be a practical addition to any aquarium it must be able to dispense the proper quantity of a given fish food, dispense it at an appropriate time, be unobtrusive so as not to detract from the beauty of the aquarium, and be priced competitively with other aquarium accessories.

When feeding aquarium fish, a sufficient quantity of food must be instantaneously deposited on the water so the aggressive fish can't consume it all before the others feed. At the same time, care must be taken not to feed in excess because unconsumed food spoils the water.

Dispensers of prior art devices are coupled to a synchronous motor geared to produce an output drive of one or two revolutions a day to provide the periodic automatic fish feeding. The dispenser coupled to such a motor must include mechanical means to both adjust the amount of food dispensed and to dispense it instantaneously.

A prototype fish feeder of my design consists of a dispenser of my invention coupled to an electronically controlled rotatable drive shaft. A presettable electronic clock triggers the occurrence of feeding, and the amount dispensed is an electronic preset for the number of rotations of the dispenser which dispenses a constant quantity of food each rotation. Because the set number of rotations are executed fairly rapidly, the tasks of adjusting the quantity dispensed and of dispensing it instantaneously are addressed by the electronic control module.

The prototype fish feeder of my design provides settings for 1 to 10 rotations of the dispenser. This provides a range of quantity dispensed that is difficult to match by mechanical means given one rotation. Furthermore, when a number of rotations are required to dispense the desired quantity, a consistent dispensed quantity is achieve because the individual dispenses are averaged. A further advantage of this rotating dispenser is the mixing action which allows the aquarist to fill the dispenser with an assortment of fish foods for simultaneous dispensing.

An inherent problem of fish feeders incorporating a synchronous motor is that the port in the dispenser through which food is dispensed is either permanently facing the water, or it spends several hours of a 24 hour period in a downward position. The dispense port then provides a channel for the rising water vapor to enter the dispenser, and the dry fish food within may clot together in the presence of this extra moisture and jeopardize the dependability of the fish feeder.

The electronic control module allows the dispenser of my invention to remain stationary between occurences of dispensing, in a position with its dispense port protected from rising water vapor.

Because adjusting the quantity dispensed, dispensing it instantaneously, and keeping the fish food dry are all challenges met by an electronic control module as previously described. A fish food dispenser of my invention specializes in adapting to the various forms and sizes of fish food available to assure that an appropriately small quantity of food is dispensed each rotation.

By doing so, multiple rotations of the dispenser are required to dispense a sufficient quantity of food in the aquarium, and this dispensed quantity may be easily adjusted by increasing or decreasing the number of dispenser rotations.

Added benefits of the dispenser of my invention include no moving parts, and the absence of any small holes or crevices that may otherwise clog with large food particles.

Prior art dispensers were designed to perform well with granular food which exhibits a sand-like flow charateristic, but exhibit various degrees of ability to dispense fish food consisting of larger particles such as flakes, pellets, and stick foods which are now popular.

SUMMARY OF THE INVENTION

The object of my invention is the design of a dispenser of flowable material that is simple in form for reliability, manufacturing ease, and minimal price, able to dispense a small yet consistent amount of a great variety of material forms and sizes, and that houses the material for dispense in an environment shielded from moisture and other elements.

The simplist embodiment of the dispenser of my invention consists of a cylinder capped with radial walls to form a chamber within which material for dispense is stored. One radial wall is mountable to a power shaft for rotation of the dispenser.

A scoop is mounted on the peripheral wall in the chamber. Rotation of the dispenser causes the scoop to fill with a portion of material for dispense. As rotation continues, this scooped material is lifted above the level of the stored material and a leveling effect occurs as some of the scooped material falls from the scoop. As the scoop rotates through the top of the chamber, the remaining scooped material falls from the scoop with forward momentum.

A chute mounted on the peripheral wall in the chamber forms an opening into the chamber facing the scoop and preceeding it in rotation. The chute opening is positioned such that it catches a portion of the material falling from the scoop. The chute leads to a discharge port through the peripheral wall, whereby material previously entering the chute opening is channeled through the dispense port.

Thus the dispense quantity is measured and reduced when the material undergoes leveling in the scoop, and when only a portion of the remaining scooped material enters the chute opening. This two step approach enables the dispenser to dispense a minimal yet consistent quantity of the material for dispense. Furthermore, the simple design with no moving parts minimizes the chance of clogging or other failure, and facilitates easy and inexpensive manufacture of the dispenser.

A refinement of this first embodiment is to shape the scoop with leading edges such that scooped material is channeled to the position in the scoop directly behind the chute opening. The resulting advantage is that a more complete evacuation of the material for dispense from the chamber is attained.

In another refinement of the first, or in combination with the second, a ramp is added that spans from the scoop to the chute opening. The ramp enables a portion of the scooped material, as it spills from the scoop at the top of the chamber, to slide to the chute opening. And the width of the ramp may be present to achieve a desired dispense quantity.

A further refinement, consisting of gaps in the scoop, enables an automatic fish feeding device equipped with the dispenser of my invention to properly feed a greater variety of aquatic life. The gaps may be in the form of holes or slots. Because fine granular material sifts through the gaps, reducing the quantity of scooped material, and larger nuggets bridge over the gaps, the same dispenser can dispense tiny portions of fine granular food to small fish or dispense generous portions of nugget food to larger fish.

If the gaps are formed with a tapering width, the quantity of material held by the scoop will vary according to the particle size of the material for dispense, and the dispenser will dispense increasingly larger quantities when filled with material for dispense of increasingly larger particle size.

An optical addition to the dispenser is a flap which is hingeably attached to the outside peripheral wall of the dispenser such that during rotation it alternately swings away and rests upon the dispenser wall. The attach point is directly preceeding the dispense port during rotation so that when the dispense port faces up, it is covered by the flap.

In use in an automatic fish feeding device, the dispenser is mounted to a rotatable drive shaft of an electronic control module. The quantity of food dispensed is a function of the electronic control module which rotates the dispenser a preset number of rotations at the time of feeding. The material for dispense within the dispenser is protected from rising water vapor because the dispense port normally remains in a face up position and may be covered by a flap. Consequently, the dispenser used in an automatic fish feeder can be close to the water in a position occupying the hole in the tank cover through which feeding occurs. This prevents fish from jumping through this hole, and allows a lower profile of the feeder for less clutter and more clearance for display cabinets.

DESCRIPTION OF SPECIFIC EMBODIMENTS

Figure 1:
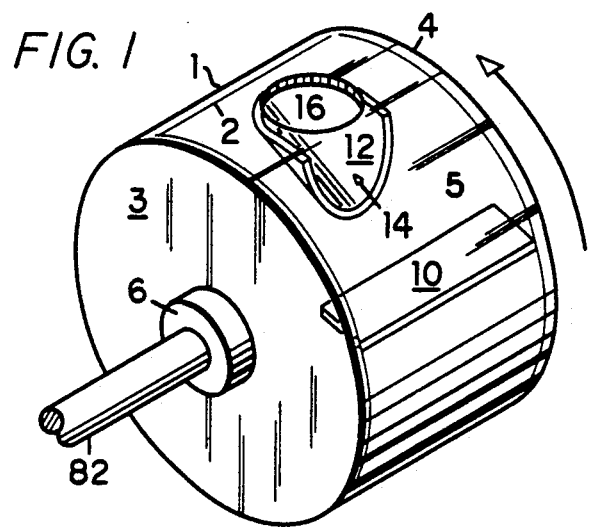
FIG. 1 is a perspective view of a dispenser made of clear plastic in accordance with this invention.

The simplist embodiment of the dispenser is illustrated in FIG. 1. It consists of a cylinder 1 the internal wall of which will be referred to as a peripheral wall 2. Radius walls 3 and 4 cap the open ends of said cylinder 1 to form a chamber 5. Said radial wall 3 is mounted to a horizontal power shaft 82 for rotation of the dispenser. In a prototype model a friction sleeve 6, permanently affixed to said radial wall 3, secures the dispenser to said power shaft 82. A scoop 10 is mounted on said peripheral wall 2. Also mounted on said peripheral wall 2 is a chute 12 which forms an opening into said chamber 5, referred to as a chute opening 14, facing said scoop 10. Said scoop 10 and said chute 12 are spaced apart from each other a sufficient distance to allow material for dispense to flow freely between. Said chute 12 leads to a dispense port 16 through said peripheral wall 2.

FIGS. 6–9 diagram the dispensing action of one rotation of the dispenser, hereby referred to as a dispense cycle. Represented by small circles within said chamber 5 is the material for dispense, and that which is contained in said scoop 10 will be referred to as the scooped material.

Figure 8:
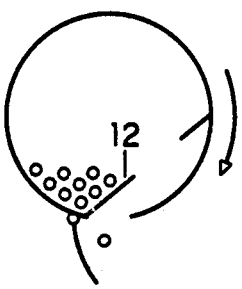
Figure 9:
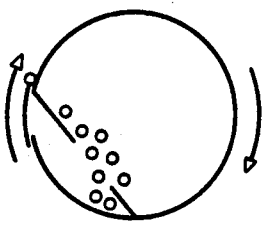
Figure 10:
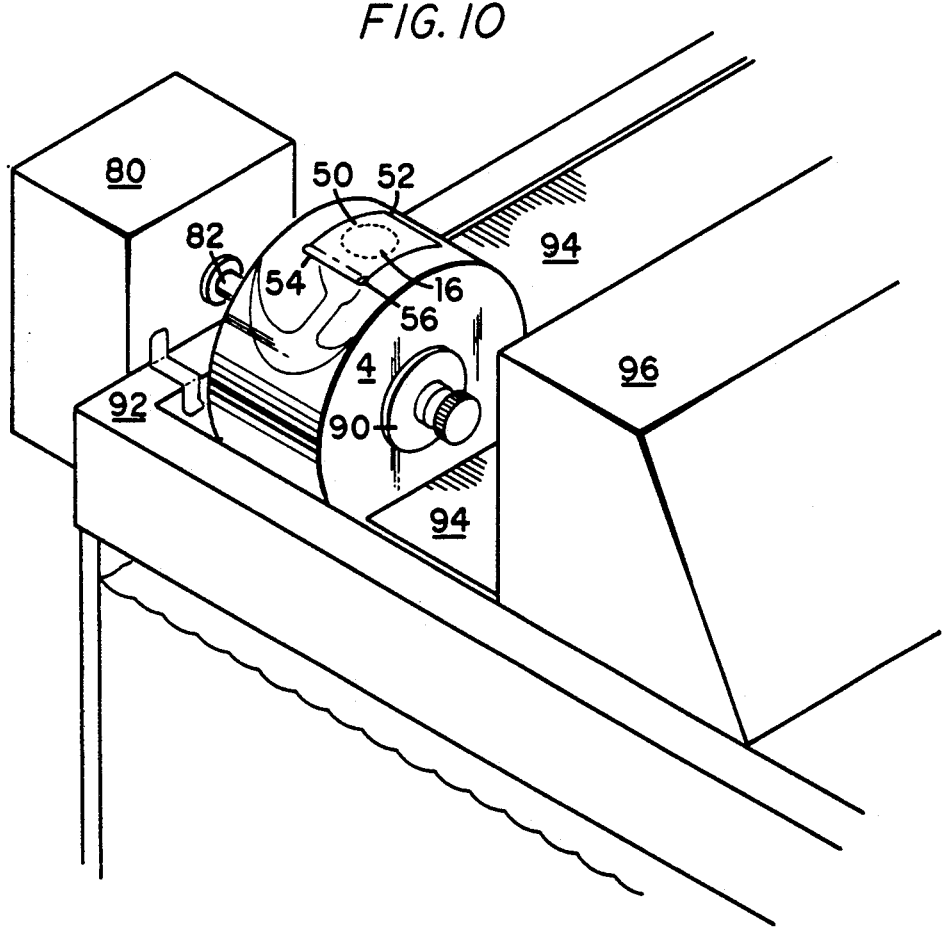
FIG. 10 is a perspective view of a dispenser coupled to an electronic control module, and mounted on an aquarium to function as an automatic fish feeder.

Also illustrated in FIGS. 6–10 is a flap 50 which has a hinged end 52 and a free end 54. In a prototype a piece of tape is doubled over itself to form the nonadhesive flap portion, and one end of the tape extends beyond the fold for adhesion to the dispenser to form said hinged end 52. In FIG. 10, said free end 54 is shown weighted by a short piece of metal rod 56 contained within the fold of the tape.

Figure 6:
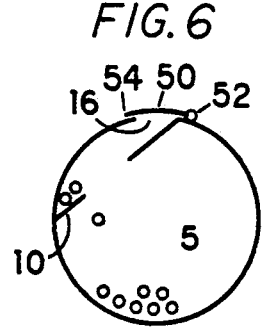
FIGS. 6–9 are sequential diagrammatic front views of a dispenser during rotation illustrating the method of dispensing.

FIG. 6 shows the position of the dispenser at rest with its dispense port 16 facing up and covered by said flap 50. Said scoop 10 is filled with a portion of the material for dispense, the scooped material, as a result of the previous dispense cycle.

Figure 7:
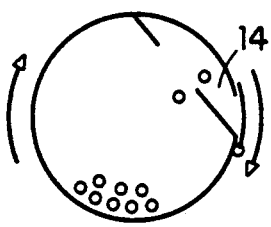

FIG. 7 illustrates the first part of the dispense cycle. As said scoop 10 rotates through the top of said chamber 5, its angle of inclination approaches vertical and the scooped material falls. A portion of the falling material enters said chute opening 14 and a portion returns to said chamber 5.

In FIG. 8 dispensing is occurring as said dispense port 16 is oriented downward and said flap 50 is open. That portion which previously entered said chute opening 14 is allowed to fall by gravity through said dispense port 16. Also apparent in FIG. 8 is the function of said chute 12 in preventing the material for dispense, that wasn't previously elevated by said scoop, from directly falling through said dispense port 16 oriented in this downward position. Because said chute opening 14 faces opposite to the direction of dispenser rotation, material for dispense is denied direct access to said dispense port 16.

FIG. 9 shows that as the dispenser continues to rotate, said scoop 10 is generously filled with material for dispense as it flows over said chute 12. In the actual embodiments of the invention the material for dispense flows around said chute 12, as well as over it, assuring a complete filling of said scoop 10.

Referring back to FIG. 6, the dispenser completes the dispense cycle with said dispense port 16 facing up and covered by said flap 50. Also shown is that the scoop material is elevated above the level of the material for dispense, allowing a leveling effect to take place as some of the scooped material falls from said scoop 10. If the level of material for dispense is high, the leveling of said scoop 10 may take place at the beginning of the next dispense cycle when the scooped material is further elevated.

Thus the dispenser can dispense a minimal yet consistent amount of flowable material because of the leveling of said scoop 10, and because only a portion of the scooped material enters said chute opening 14.

Said scoop 10 fills as it passes through the bottom of said chamber 5 by collecting food flowing around and over said chute 12 which preceeds said scoop 10 during rotation. But as the quantity of food stored in said chamber 5 is reduced, the remaining particles tend to flow only around said chute 12. As a consequence, these final particles are displaced to one side or the other of said chute 12 as they are scooped up by said scoop 10, and are unlikely to fall from said scoop 10 into said chute opening 14 for subsequent dispense.

Figure 2:
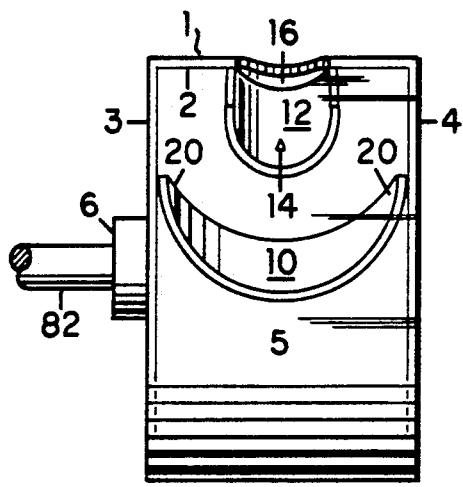
FIG. 2 is a side view of the dispenser of FIG. 1 with a refined scoop having leading edges, and made in accordance with this invention.

A refinement of the basic dispenser is to shape said scoop 10 with leading edges 20, shown in FIG. 2, which better enable the dispenser to dispense these final food particles. Said leading edges 20 redirect food flowing around said chute 12, so that it is scooped up directly behind said chute 12 when it will be more likely to fall into said chute opening 14 for subsequent dispense.

Figure 3:
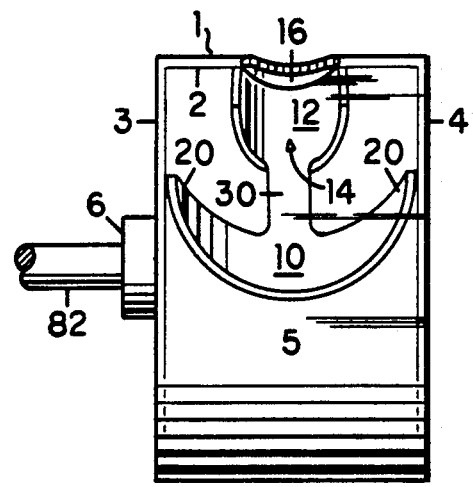
FIG. 3 is a side view of the dispenser of FIG. 2 further comprising a ramp, and made in accordance with this invention.

FIG. 3 illustrates a dispenser comprising a further element shown in conjunction with the previous refinement of said leading edges 20. A ramp 30 is added that spans from said scoop 10 to said chute opening 14. When the full scoop 10 rotates through the top of said chamber 5 and the scooped food falls, said ramp 30 enables a portion of the falling food to slide to said chute opening 14. Excess food falls from said ramp 30 before reaching said chute opening 14. Because the width of said ramp 30 influences the quantity of food entering said chute opening 14, the width of said ramp 30 may be preset to achieve a desired dispense quantity.

Figure 4:
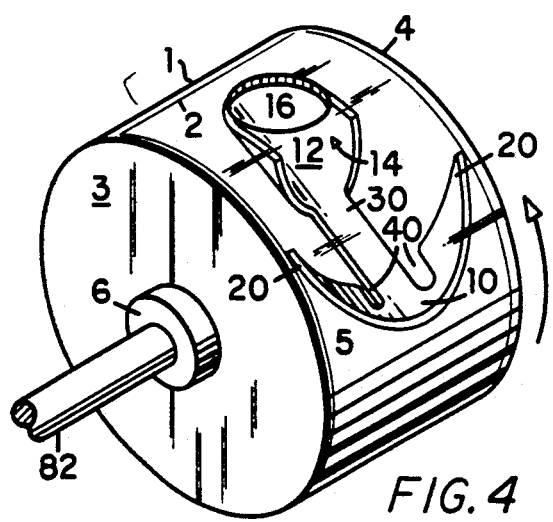
FIG. 4 is a perspective view of the dispenser of FIG. 3 including another refinement, marked by the presence of gaps in the scoop, and made in accordance with this invention.

An even further refined dispenser is shown in FIG. 4. It incorporates the previous two refinements and adds a further refinement of forming said scoop 10 with gaps 40. Said gaps 40 enable an automatic fish feeder equipped with a dispenser of my invention, to accomodate a wide variety of fish foods and properly feed a larger variety of fish. Tiny fish are fed small portions of fine granular food whereas larger fish are fed more generous portions of larger nuggets. Without the gaps, a dispenser designed to dispense large particle fish food tends to dispense too much fine granular food in a single dispense cycle.

A portion of scooped fine granular food sifts through said gaps 40 which can be either holes or slots in said scoop 10. Because the said scoop 10 holds less fine granular food, less is dispensed. Yet larger particles can bridge over said gaps 40, assuring that an adequate quantity of larger particle food is dispensed.

Figure 5:
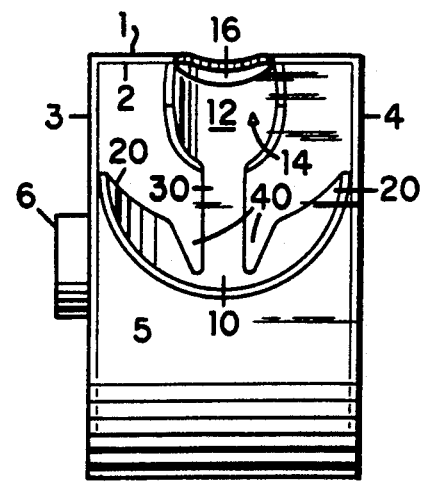
FIG. 5 is a side view of the dispenser of FIG. 4 illustrating a further refined scoop with gaps of tapering width, and made in accordance with this invention.

If said gaps 40 taper in width as in FIG. 5, the quantity of scooped material will vary according to the particle size of the material for dispense, and the quantity of material dispensed will increase when the dispenser is filled with materials of increasingly larger particle size.

FIG. 10 illustrates the dispenser of my invention coupled to said rotatable drive shaft 82 of an electronic control module 80 which is mounted on the back edge of an aquarium 92 for the purpose of automatic fish feeding. Said electronic control module 80 contains a clock to trigger the occurrence of feeding, and, utilizing a common electronic counter, is presettable for the number of rotations of the dispenser at each feeding.

Pictured in FIG. 10 is a removable fill cap 90 which seals a hole in said front radial wall 4 through which the dispenser can be easily refilled with fish food.

Also shown in FIG. 10 is said flap 50 whose function was previously described and illustrated in FIGS. 6-9. Said flap 50 is shown covering said dispense port 16 which is at rest in its top position. Because fish food contained within the dispenser is protected from rising water vapor, the dispenser can occupy the hole in the aquarium cover 94 through which feeding occurs, thus preventing the escape of jumping fish. Also the resulting low profile helps to conceal the fish feeder behind an aquarium reflector light 96, and permits its use in low clearance cabinets.

Actual embodiments of the invention were constructed entirely of clear plastic for visibility of the material for dispense within, and to avoid any adverse effect on aquarium water as some other materials may cause. Said scoop 10, ramp 30, and chute 12 were cut from a semi-rigid clear plastic tubing, and said scoop 10 was flanged outward before attachment to said peripheral wall 2 by a suitable adhesive. They could probably more easily be cut and thermally shaped from sheet plastic.

What is claimed is:

1. A dispenser of dry fish food comprised of: a casing mounted on a horizontal power shaft for rotation therewith, a chamber within said casing defined by peripheral and radial walls, said chamber stores dry fish food for dispense, a dispense port through said peripheral wall of said chamber, a chute mounted on said peripheral wall surrounding said dispense port, said chute forming an opening into said chamber, a chute opening, facing opposite to the direction of rotation, a scoop mounted on the peripheral wall within said chamber facing said chute opening, and following it during rotation, and said scoop spaced apart from said chute to allow food to flow freely between; whereby rotation of said casing causes said scoop to pass through the bottom of said chamber and fill with the food stored therein, and continued rotation brings said full scoop to the top of said chamber where its angle of inclination approaches vertical, causing the food to fall from said scoop, and whereby some of the falling food returns to said chamber, and some enters said chute opening and is guided by said chute to said dispense port.

2. A dispenser of dry fish food comprised of: a casing mounted on a horizontal power shaft for rotation therewith, a chamber within said casing defined by peripheral and radial walls, said chamber stores dry fish food for dispense, a dispense port through said peripheral wall of said chamber, a chute mounted on said peripheral wall surrounding said dispense port, said chute forming an opening into said chamber, a chute opening, facing opposite to the direction of rotation, a scoop mounted on the peripheral wall within said chamber facing said chute opening, and following it during rotation, said scoop spaced apart from said chute to allow food to flow freely between, and a ramp spanning from said scoop to said chute opening; whereby rotation of said casing causes said scoop to pass through the bottom of said chamber and fill with the food stored therein, and continued rotation brings said full scoop to the top of said chamber where its angle of inclination approaches vertical, causing the food to fall from said scoop, and whereby some of the falling food returns to said chamber, and some slides the length of said ramp to said chute opening where it is guided by said chute to said dispense port.

3. A dispenser of dry fish food comprised of: a casing mounted on a horizontal power shaft for rotation therewith, a chamber within said casing defined by peripheral and radial walls, said chamber stores dry fish food for dispense, a dispense port through said peripheral wall of said chamber, a chute mounted on said peripheral wall surrounding said dispense port, said chute forming an opening into said chamber, a chute opening, facing opposite to the direction of rotation, a scoop mounted on the peripheral wall within said chamber facing said chute opening, and following it during rotation, said scoop spaced apart from said chute to allow food to flow freely between, and one or more gaps present in said scoop which reduce the quantity of fine granular food that may be held by said scoop; whereby rotation of said casing causes said scoop to pass through the bottom of said chamber and fill with the food stored therein, and continued rotation brings said full scoop to the top of said chamber where its angle of inclination approaches vertical, causing the food to fall from said scoop, and whereby some of the falling food returns to said chamber, and some enters said chute opening and is guided by said chute to said dispense port.

* * * * *